Oct. 21, 1969  D. E. DEFORD ET AL  3,473,405

LASH-FREE LATCHING MECHANISM FOR ADJUSTABLE STEERING COLUMN

Filed Nov. 30, 1967

INVENTORS
Donald E. Deford, &
BY  Charles R. Rank

W. F. Wagner
ATTORNEY

United States Patent Office 3,473,405
Patented Oct. 21, 1969

3,473,405
LASH-FREE LATCHING MECHANISM FOR
ADJUSTABLE STEERING COLUMN
Donald E. Deford, Saginaw, and Charles R. Rank, Frankenmuth, Mich., assignors to General Motors Corporation, Detroit, Mich., a corporation of Delaware
Filed Nov. 30, 1967, Ser. No. 687,034
Int. Cl. G05g 1/18
U.S. Cl. 74—493                                4 Claims

ABSTRACT OF THE DISCLOSURE

A latching shoe pivotally mounted on a fixed pin by a slot formed in the shoe straddling the pin, with a spring element arranged to urge the shoe in a direction maintaining continuous lash-free bearing engagement between the pin and the base of the slot.

---

This invention relates to steering mechanisms and more particularly to a steering column assembly providing selective angular adjustment of the steering wheel and adjacent portion of the column about a horizontal axis extending transversely of the vehicle.

The present invention is concerned primarily, although not exclusively, with improvements in adjustable steering column assemblies of the type disclosed in U.S. Patent No. 3,167,971, Zeigler et al., issued Feb. 2, 1965, entitled "Adjustable Steering Column," and assigned to General Motors Corporation.

An object of the invention is to provide an improved selectively angularly adjustable steering column assembly.

A further object is to provide a tiltably adjustable steering column assembly incorporating lash-free latching mechanism.

A still further object is to provide an arrangement of the type described in which the latching mechanism incorporates a lash-free pivotal mounting which automatically compensates for normal wear so that the initial lash-free relationship is maintained throughout the service life of the mechanism.

In an adjustable steering column of the type described in U.S. 3,167,971, Zeigler et al., a range of angular positions of adjustment of the plane of rotation of the steering wheel are established by a multiple notch latching shoe which is pivoted to one of two relatively angularly movable members with the multiple notches spaced so that successive engagement thereof with a pin mounted in the other of the relatively movable members determines a selected angular position and retains the relationship in precision relation. In the present invention, the pivoting shoe is constructed and arranged relative to its pivotal axis to achieve initial bearing engagement and assure that any wear occurring during the operating life of the device is automatically compensated, thus assuring optimum lash-free operation.

The foregoing and other objects, advantages and features of the invention will become more fully apparent as reference is had to the accompanying specification and drawing wherein.

Figure 1:
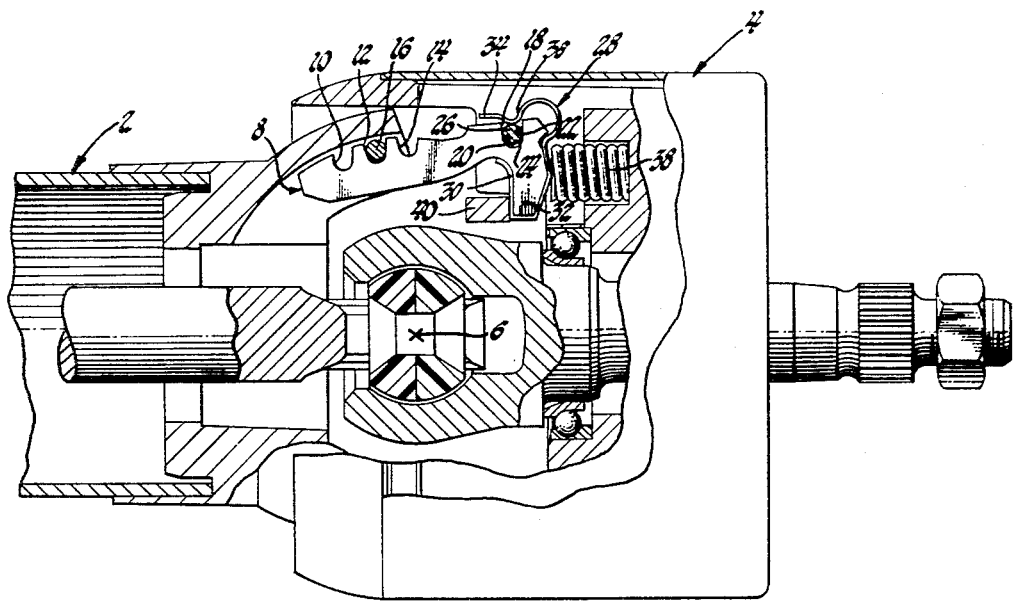
FIGURE 1 is an enlarged side elevational view, partly in section and with parts broken away, illustrating details of construction of a steering assembly incorporating the invention.
Figure 2:
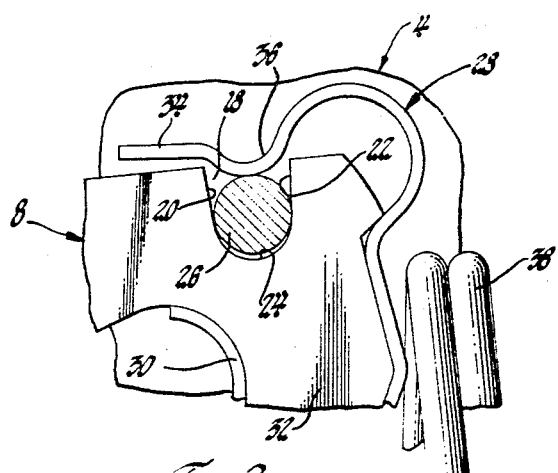
FIGURE 2 is a greatly enlarged view of a portion of the construction shown in FIGURE 1.

Referring now to the drawing and particularly FIGURE 1, there is shown a portion of an adjustable steering column assembly which includes a fixed column portion 2 and a tiltable column portion 4. Column portion 4 is adapted for angularly adjustable positioning relative to portion 2 about a transverse axis 6 to any of a plurality of fixed angular positions both clockwise and counterclockwise from the normal aligned position shown. Retention of column 4 in each selected position is accomplished by means of one or more spring biased manually displaceable latching shoes 8 pivotally mounted on column 4 and having a plurality of notches 10, 12 and 14 which selectively engage a fixed pin 16 mounted on column 2. Inasmuch as the remaining details of construction of the column assembly form no part of the present invention, and correspond with those of the aforementioned patent, U.S. 3,167,971, Zeigler et al., further description thereof will be omitted.

In the aforementioned patent, the latching shoe is pivotally mounted on a pin by means of a precision bore which closely surrounds the pin. In such a construction, the degree of freedom from play or lash is manifestly dependent upon selective mating of the pin and bore. Additionally, under extreme conditions and protracted operational use, a degree of wear could occur permitting a slight but nevertheless discernable degree of play with respect to each of the angular positions of adjustment of the wheel.

In order to obviate expensive and time consuming selective mating of parts and eliminate deterioration in precision resulting from wear, in accordance with the present invention the pivotal latching shoe 8 is constructed and arranged to assure absolute precision of pivotal bearing engagement both initially and throughout the entire service life of the mechanism. In accomplishing this objective, the shoe 8 is formed at its pivoting end with a transverse slot 18 having side walls 20 and 22 which taper progressively inwardly toward the curved base portion 24. Slot 18 straddles a fixed pin 26 mounted rigidly on column portion 4 and is resiliently biased relative thereto in a direction tending to urge the pin into continuous bearing engagement with the base of the slot. In the embodiment shown in FIGURE 1, the biased engagement between shoe 8 and pin 26 is achieved and maintained by the provision of a preformed spring clip 28 having a portion 30 arranged in clasping engagement with the inwardly projecting leg 32 of shoe 8 and a finger portion 34 having an arch 36 abutting pin 26 and exerting continuous resilient biasing engagement therewith. Thus, the latching shoe 8 pivots about the axis of pin 26 responsive to pressure from compression spring 38 disposed between column portion 4 and leg 32 to maintain the notches 10, 12 or 14 in latching engagement with pin 26, while the spring clip 28 continuously maintains a lash-free engagement between the shoe slot 18 and pin 26. Manual displacement of the shoe about pin 26 is accomplished by angular displacement of ring 40 in the same manner as described in more detail in U.S. 3,167,971.

Figure 3:
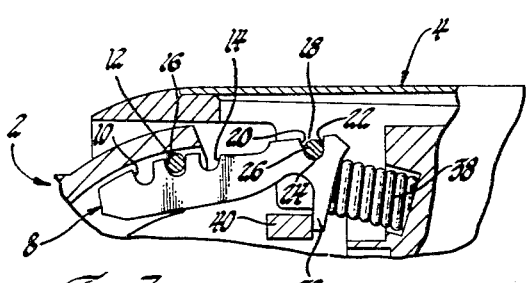
FIGURE 3 is a fragmentary side elevational view of a modification of the invention shown in FIGURE 1.

In FIGURE 3, there is shown a modification of the invention enabling total elimination of the spring clip 28. In this embodiment, the compression spring 38, which normally serves to swingably bias the latching shoe into engagement with pin 26, is angularly oriented relative to the leg 32 and pin 26 so as to produce a component of resilient force which also acts to bias the tapered slot 18 into continuous precision bearing engagement with pin 26.

From the foregoing, it will be seen that a novel and improved construction has been provided enabling the establishment and maintenance of a lash-free angularly adjustable steering column assembly.

While two embodiments of the invention have been shown and described, it will be apparent that other changes and modifications may be made therein. It is therefore, to be understood that it is not intended to limit the invention to the embodiments shown.

What is claimed is:

1. In a tiltably adjustable steering assembly having a manually displaceable pivotally mounted latching shoe normally yieldably biased into locking positions operative to retain said assembly in a plurality of selected angular positions of adjustment, a lash free pivot mounting for said shoe comprising a fixed pin on said assembly, a tapered slot formed in said shoe straddling said pin, and spring means biasing the base of said slot in continuous bearing engagement with said pin.

2. The invention of claim 1 wherein said spring means is mounted on said shoe.

3. The invention of claim 1 wherein said spring means is mounted between said shoe and said assembly.

4. The invention of claim 3 wherein said spring means is angularly oriented relative to said pin so as to angularly bias the shoe into latching engagement while maintaining said slot base in continuous bearing engagement with said pin.

References Cited

UNITED STATES PATENTS 3,167,971  2/1965  Ziegler et al. _____ 74—493

MILTON KAUFMAN, Primary Examiner